United States Patent
Hwang et al.

(10) Patent No.: US 9,807,638 B2
(45) Date of Patent: Oct. 31, 2017

(54) METHOD FOR REPORTING CHANNEL QUALITY

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/915,498

(22) PCT Filed: Sep. 5, 2014

(86) PCT No.: PCT/KR2014/008366
§ 371 (c)(1),
(2) Date: Feb. 29, 2016

(87) PCT Pub. No.: WO2015/037883
PCT Pub. Date: Mar. 19, 2015

(65) Prior Publication Data
US 2016/0227426 A1    Aug. 4, 2016

Related U.S. Application Data

(60) Provisional application No. 61/876,238, filed on Sep. 11, 2013.

(51) Int. Cl.
*H04L 5/14* (2006.01)
*H04W 24/10* (2009.01)
(Continued)

(52) U.S. Cl.
CPC .......... *H04W 24/10* (2013.01); *H04B 17/309* (2015.01); *H04L 5/00* (2013.01);
(Continued)

(58) Field of Classification Search
CPC ..................................................... H04W 24/10
See application file for complete search history.

(56) References Cited

U.S. PATENT DOCUMENTS 9,634,741 B2 * 4/2017 Park ....................... H04B 7/024
2013/0196675 A1    8/2013 Xiao et al.
(Continued)

FOREIGN PATENT DOCUMENTS

| KR | 10-2013-0078597 A | 7/2013 |
|---|---|---|
| WO | WO 2012/108945 A2 | 8/2012 |
| WO | WO 2013/055147 A2 | 4/2013 |

*Primary Examiner* — Gerald Smarth
(74) *Attorney, Agent, or Firm* — Birch, Stewart, Kolasch & Birch, LLP

(57) ABSTRACT

One embodiment of the present specification provides a method by which a user equipment (UE) reports channel quality. According to the method, the UE can receive a channel state information-interference measurement (CSI-IM) configuration of first and second transmission points (TPs). Here, the CSI-IM configuration includes at least three configurations for the CSI-IM, and the at least three configurations for CSI-IM can include a first CSI-IM configuration for measuring interference to the first TP caused by the second TP, a second CSI-IM configuration for measuring interference to the second TP caused by the first TP, and a third CSI-IM configuration for measuring interference from other interference sources. Therefore, according to the channel quality reporting method, the UE can feed a channel quality indicator (CQI) measured using the first CSI-IM configuration and a CQI measured using the third CSI-IM configuration back to the first TP.

14 Claims, 17 Drawing Sheets

(51) Int. Cl.
*H04B 17/309* (2015.01)
*H04W 72/12* (2009.01)
*H04L 5/00* (2006.01)
*H04W 28/02* (2009.01)
*H04B 17/24* (2015.01)

(52) U.S. Cl.
CPC ... *H04W 28/0273* (2013.01); *H04W 72/1231* (2013.01); *H04B 17/24* (2015.01)

(56) References Cited

U.S. PATENT DOCUMENTS

| | | |
|---|---|---|
| 2013/0208604 A1 | 8/2013 | Lee et al. |
| 2014/0092878 A1* | 4/2014 | Davydov .......... H04W 52/0258 370/336 |
| 2014/0269451 A1* | 9/2014 | Papasakellariou ... H04B 7/2656 370/280 |
| 2014/0269460 A1* | 9/2014 | Papasakellariou .... H04L 5/1469 370/294 |
| 2014/0321407 A1 | 10/2014 | Seo et al. |
| 2015/0071191 A1* | 3/2015 | Kim ...................... H04L 5/0073 370/329 |
| 2016/0036571 A1* | 2/2016 | Park ...................... H04B 7/024 370/330 |
| 2017/0141832 A1* | 5/2017 | Ji ........................ H04B 7/0626 |

\* cited by examiner (b) MULTIPLE CCS (a) SINGLE CC

US 9,807,638 B2

METHOD FOR REPORTING CHANNEL QUALITY

CROSS REFERENCE TO RELATED APPLICATIONS

This application is the National Phase of PCT International Application No. PCT/KR2014/008366, filed on Sep. 5, 2014, which claims priority under 35 U.S.C. 119(e) to U.S. Provisional Application No. 61/876,238, filed on Sep. 11, 2013, all of which are hereby expressly incorporated by reference into the present application.

TECHNICAL FIELD

The present invention relates to mobile communication.

BACKGROUND ART

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be generally divided into a frequency division duplex (FDD) type and a time division duplex (TDD) type.

As set forth in 3GPP TS 36.211 V 10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in LTE, a user equipment (UE) feeds back channel state information (CSI) as an indicator representing the state of a downlink channel to a base station. The CSI may include at least one of a channel quality indicator (CQI) and a precoding matrix indicator (PMI) with respect to a channel state information-reference signal (CSI-RS).

In recent years, there have been efforts to add an interference removal function to a UE in order to improve the reception performance thereof. However, the UE measures CQI regardless of the interference removal function, resulting in an overestimate or underestimate of CQI.

DISCLOSURE

Technical Problem

Accordingly, the disclosure of the specification has been made in an effort to solve the problem.

Technical Solution

In order to achieve the aforementioned object, one disclosure of the specification provides a channel quality reporting method of a user equipment (UE). The method may comprise: receiving a channel state information-interference measurement (CSI-IM) configuration for first and second transmission points (TPs). The CSI-IM configuration may include configurations for at least three CSI-IMs. The configurations for the at least three CSI-IMs may include a configuration for first CSI-IM for measuring interference caused by the second TP toward the first TP, a configuration for second CSI-IM for measuring interference caused by the first TP toward the second TP, and a configuration for third CSI-IM for measuring interference from another interference source. The method may comprise: transmitting a channel quality indicator (CQI) measured using the first CSI-IM and a CQI measured using the third CSI-IM.

The method may further comprise: transmitting a CQI measured using the second CSI-IM and the CQI measured using the third CSI-IM.

The first CSI-IM and the second CSI-IM may be configured in different resource elements (REs).

The third CSI-IM may be configured on the same REs of the first TP and the second TP.

The transmitting may comprise transmitting one of the CQI measured using the first CSI-IM or second CSI-IM and the CQI measured using the third CSI-IM, expressed as an offset or delta value compared with the other thereof.

The method may further comprise: receiving a configuration for a channel state information-reference signal (CSI-RS) of the first TP and a configuration for a CSI-RS of the second TP.

In order to achieve the aforementioned object, one disclosure of the specification provides a method of receiving a channel quality report from a user equipment (UE) The method may comprise: transmitting, to the UE, a channel state information-interference measurement (CSI-IM) configuration for first and second transmission points (TPs). The CSI-IM configuration may include configurations for at least three CSI-IMs. The configurations for the at least three CSI-IMs may include a configuration for first CSI-IM for measuring interference caused by the second TP toward the first TP, a configuration for second CSI-IM for measuring interference caused by the first TP toward the second TP, and a configuration for third CSI-IM for measuring interference from another interference source. The method may comprise: receiving, from the UE, a channel quality indicator (CQI) measured using the first CSI-IM and a CQI measured using the third CSI-IM.

The method may further comprise: scheduling a radio resource by selecting one of the CQI measured using the first CSI-IM and the CQI measured using the third CSI-IM depending on whether interference removal support information is transmitted to the UE.

In order to achieve the aforementioned object, one disclosure of the specification provides a user equipment (UE) reporting channel quality. The UE may comprise: a receiver to receive a channel state information-interference measurement (CSI-IM) configuration for first and second transmission points (TPs). The CSI-IM configuration may include configurations for at least three CSI-IMs. The configurations for the at least three CSI-IMs may include a configuration for first CSI-IM for measuring interference caused by the second TP toward the first TP, a configuration for second CSI-IM for measuring interference caused by the first TP toward the second TP, and a configuration for third CSI-IM for measuring interference from another interference source. The UE may comprise: a transmitter to transmit a channel quality indicator (CQI) measured using the first CSI-IM and a CQI measured using the third CSI-IM.

In order to achieve the aforementioned object, one disclosure of the specification provides a base station receiving a channel quality report from a user equipment (UE). The base station may comprise: a transmitter to transmit, to the UE, a channel state information-interference measurement (CSI-IM) configuration for first and second transmission points (TPs). The CSI-IM configuration may include configurations for at least three CSI-IMs. The configurations for the at least three CSI-IMs may include a configuration for first CSI-IM for measuring interference caused by the second TP toward the first TP, a configuration for second CSI-IM for measuring interference caused by the first TP toward the second TP, and a configuration for third CSI-IM for measuring interference from another interference source. The base station may comprise: a receiver to receive, from the UE, a channel quality indicator (CQI) measured using the first CSI-IM and a CQI measured using the third CSI-IM.

Advantageous Effects

According to the disclosure of the specification, the problem in the related art is solved.

MODE FOR INVENTION

Figure 1:
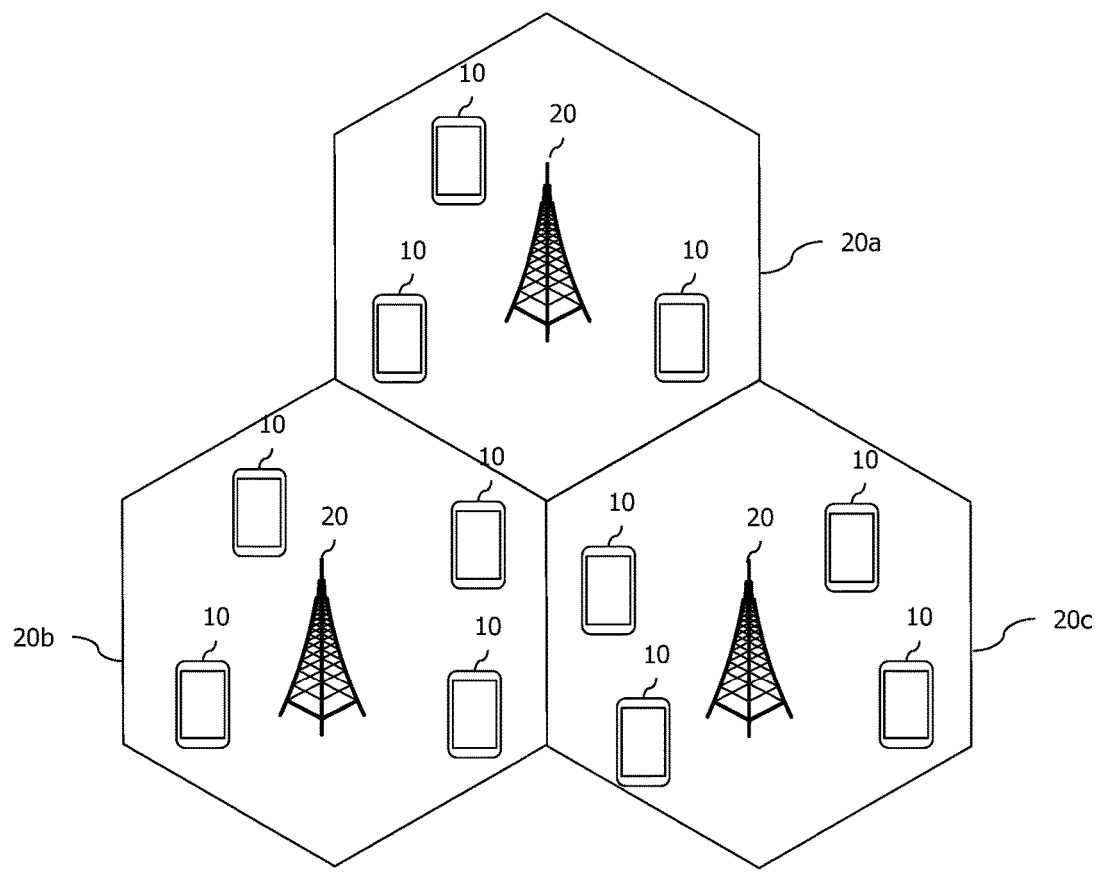
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
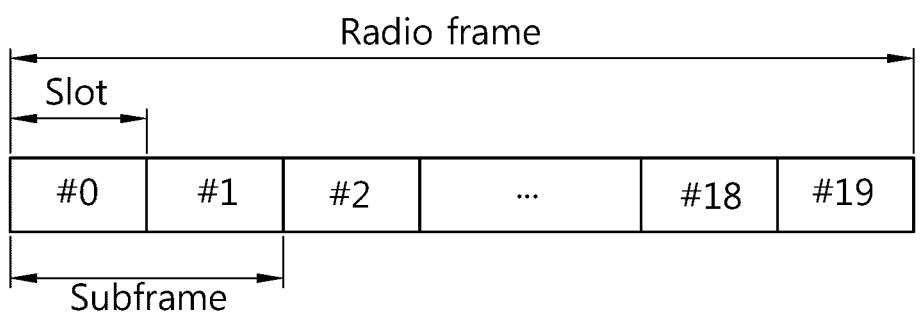
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
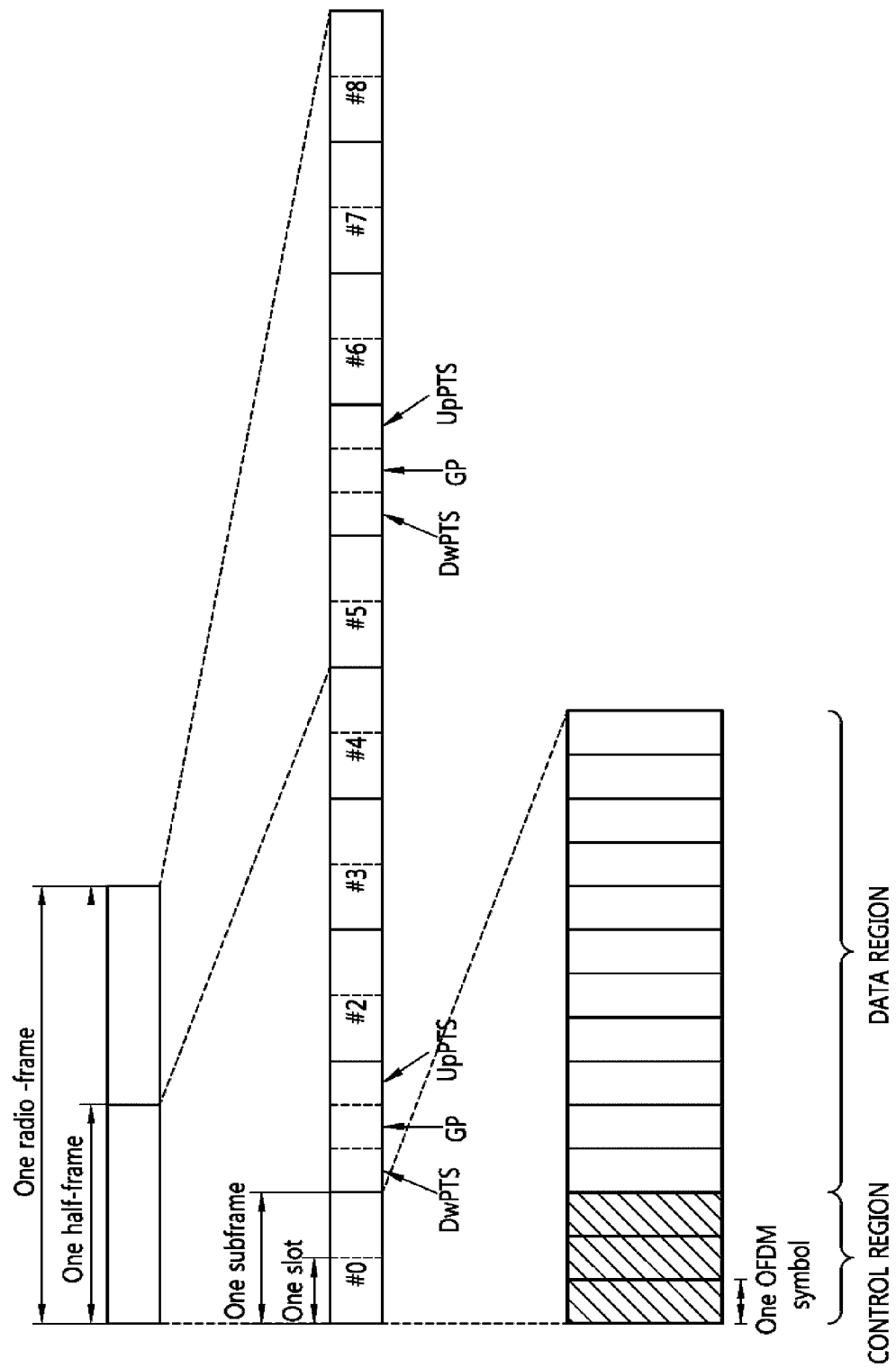
FIG. 3 illustrates the architecture of a downlink radio frame according to time division duplex (TDD) in 3GPP LTE.

FIG. 3 shows an example of a resource grid for one uplink or downlink slot in 3GPP LTE.

For this, 3GPP TS 36.211 V10.4.0 (2011 December) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). According to 3GPP TS 36.211 V8.7.0, one slot, in the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot:DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuraiton | Switch-point perio-dicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |

TABLE 1-continued

| UL-DL Configuraiton | Switch-point perio-dicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

When receiving a UL-DL configuration from the base station, the terminal may be aware of whether a sub-frame is a DL sub-frame or a UL sub-frame according to the configuration of the radio frame.

The DL (downlink) sub-frame is split into a control region and a data region in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data region.

Figure 4:
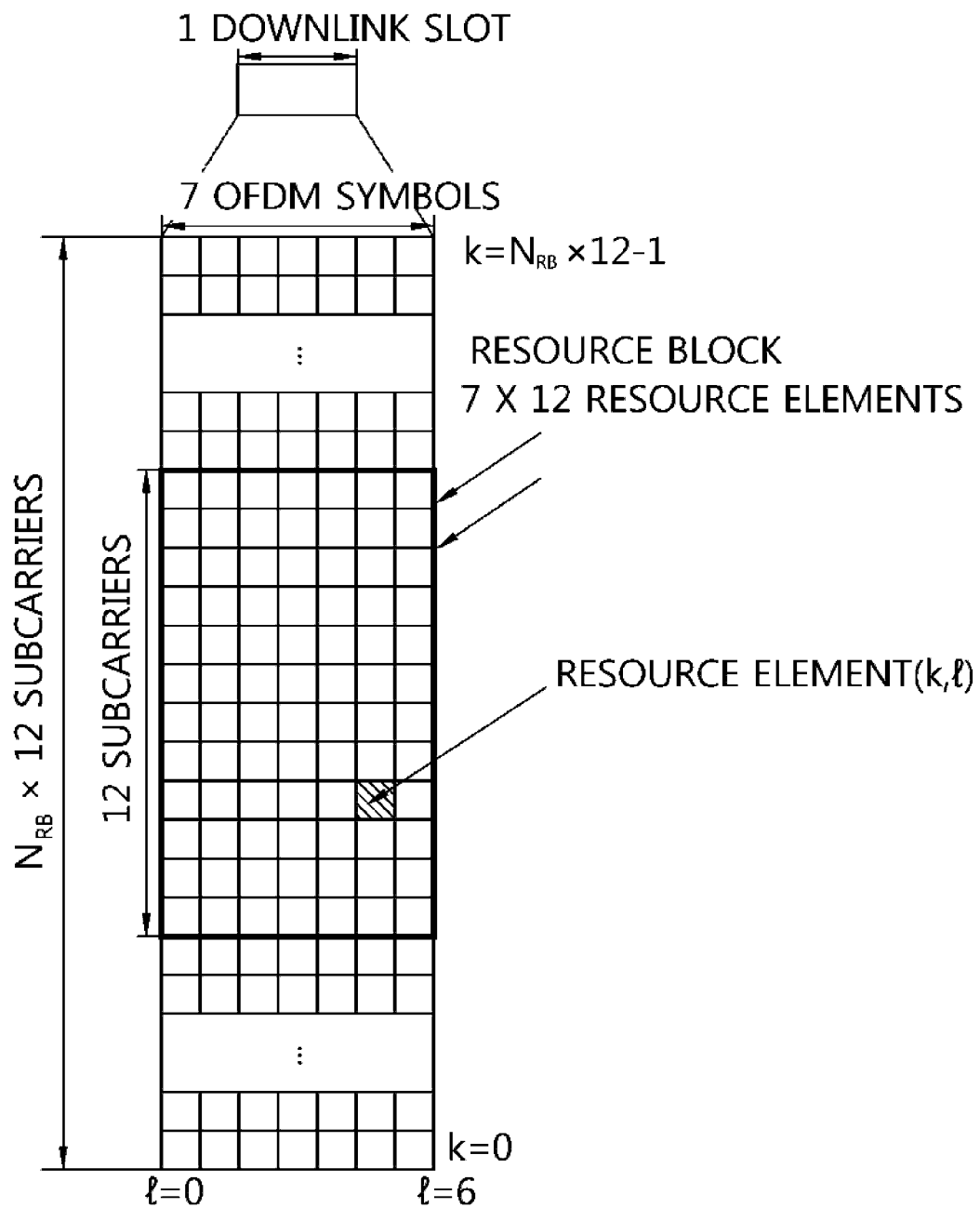
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
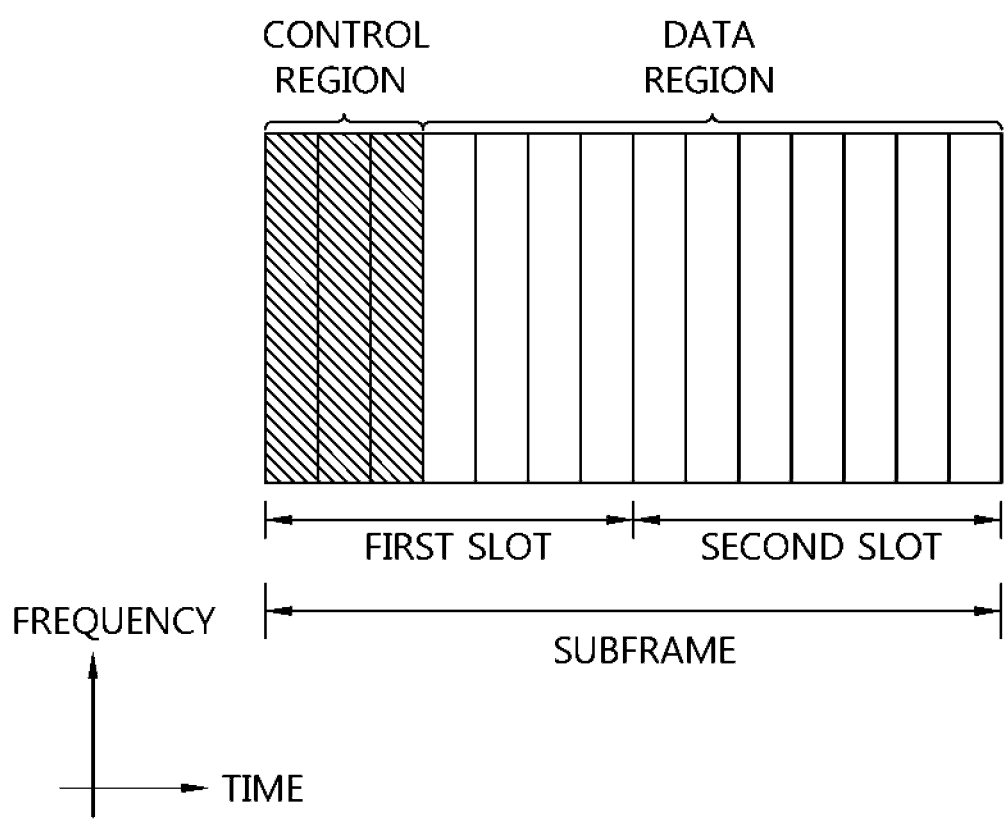
FIG. 5 illustrates the architecture of a downlink subframe.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO(Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 |

DCI formats are classified by use as follows.

TABLE 3

| DCI format | Contents |
| --- | --- |
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
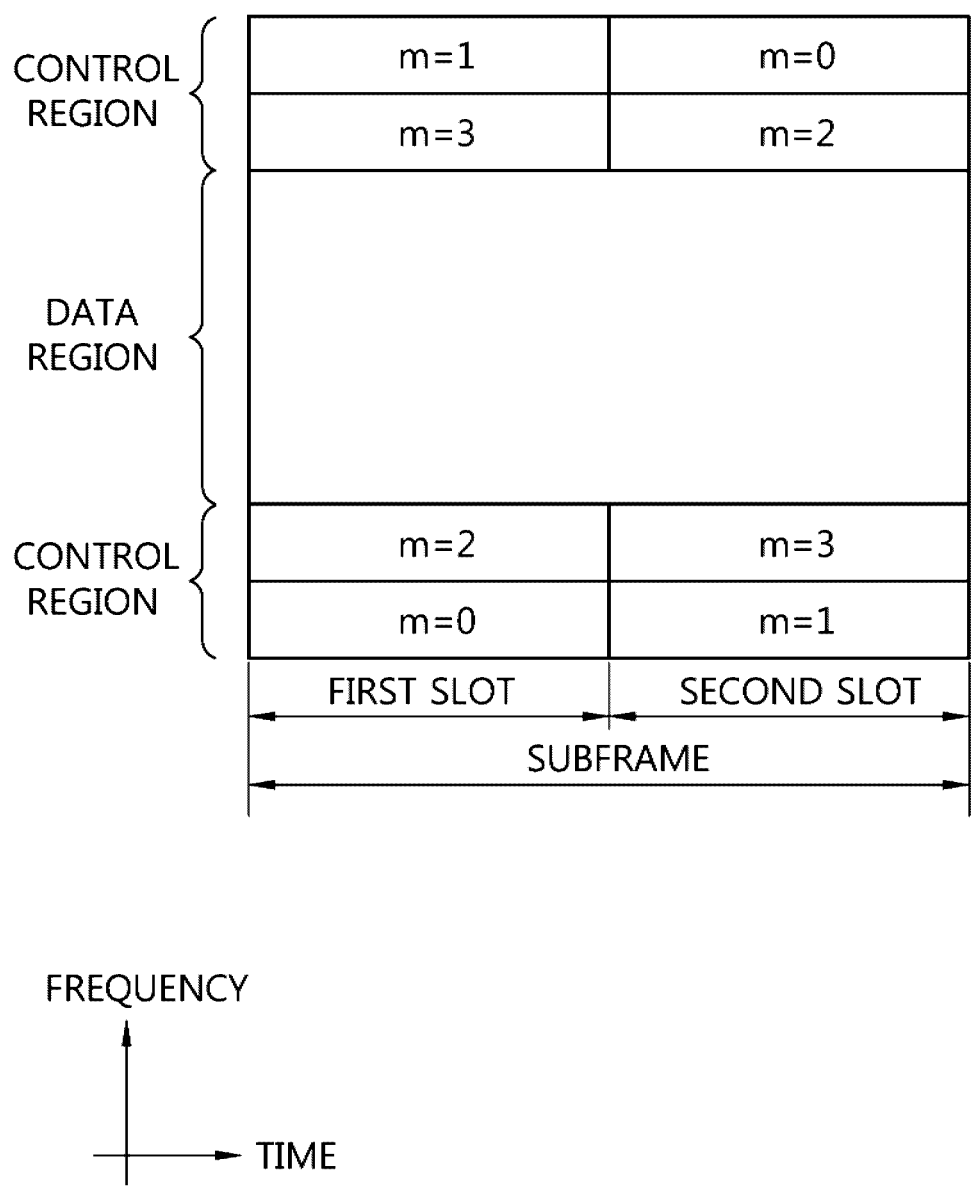
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 7:
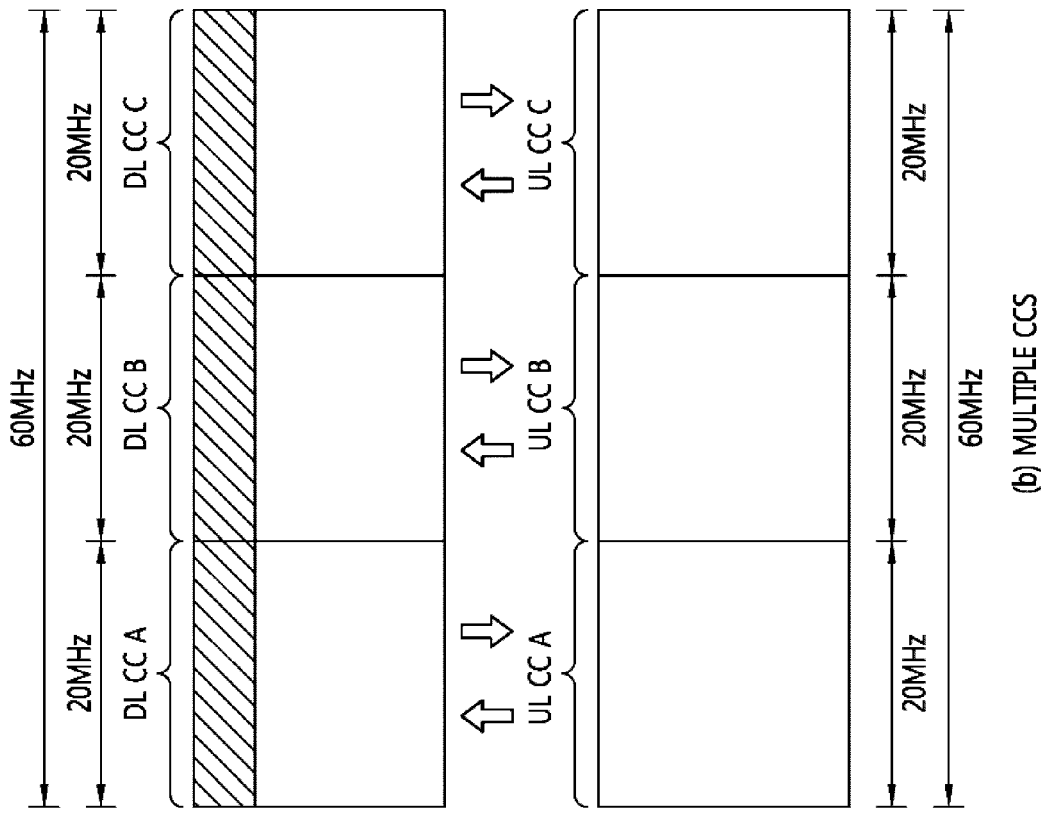
FIG. 7 illustrates an example of comparison between a single carrier system and a carrier aggregation system.
Figure 7:
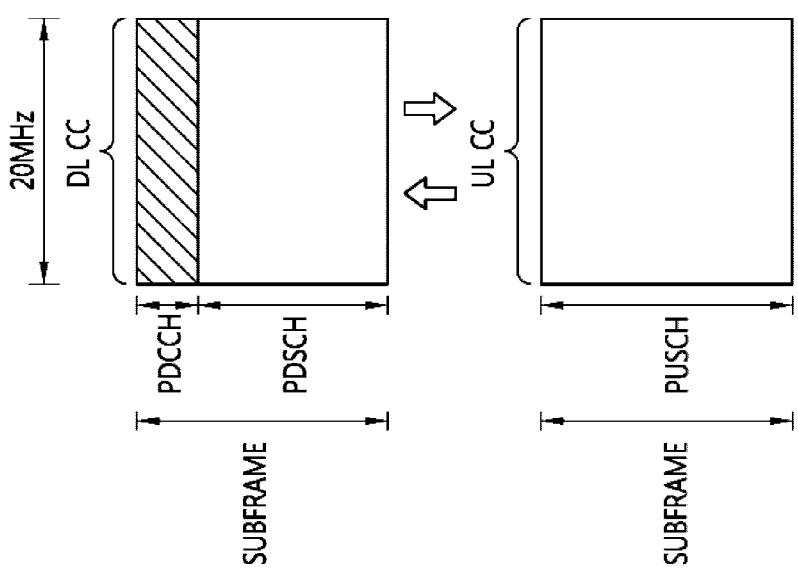

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
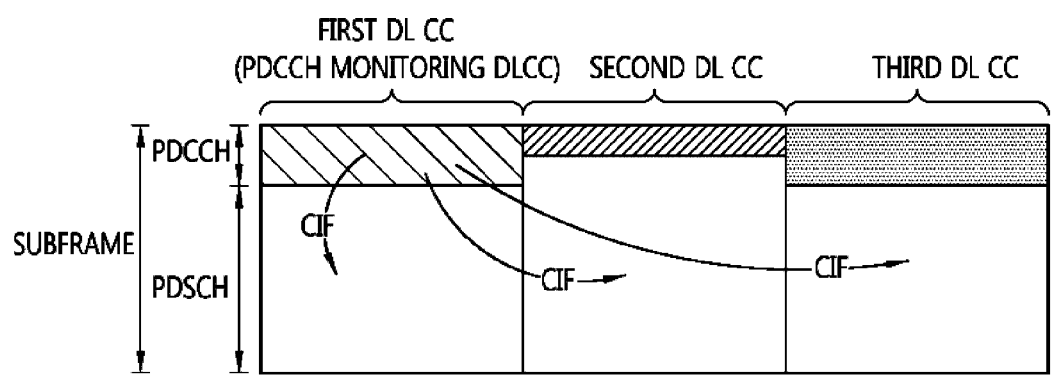
FIG. 8 exemplifies cross-carrier scheduling in a carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS. It is hereinafter assumed that the DM-RS is a DRS.

Figure 9A:
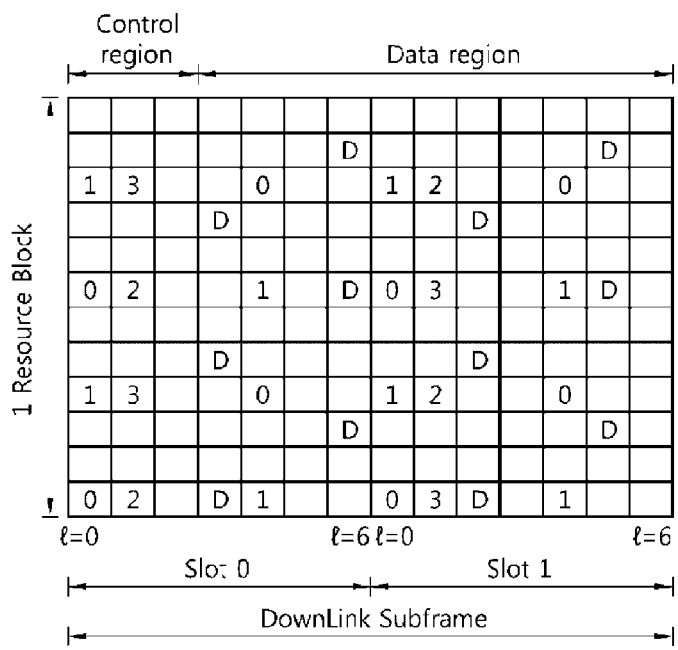
FIG. 9a illustrates an example of a reference signal (RS) structure that may support four antenna ports in normal cyclic prefix (CP).
Figure 9B:
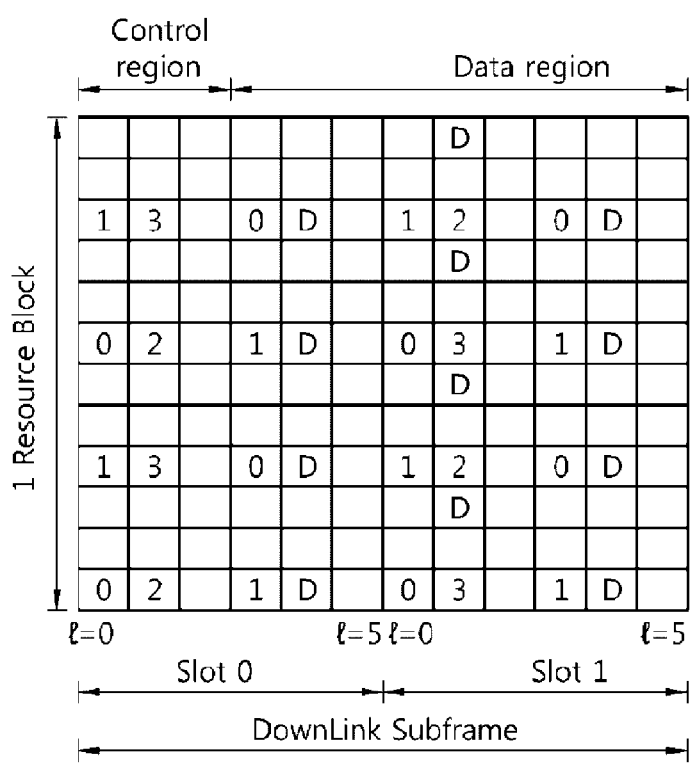
FIG. 9b illustrates an example of an RS structure that may support four antenna ports in extended CP.

FIG. 9a illustrates an example of an RS structure that may support four antenna ports in normal CP. FIG. 9b illustrates an example of an RS structure that may support four antenna ports in extended CP.

The RS structures of FIGS. 9a and 9b are RS structures used in a conventional 3GPP LTE system.

The resource element marked with one of 0 to 3 in FIGS. 9a and 9b denotes a resource element where a cell-specific reference signal, i.e., a common reference signal (CRS) is transmitted. Here, any one of 0 to 3 denotes a supported antenna port. That is, resource elements marked with p (p is any one of 0 to 3) mean resource elements to which a common reference signal for antenna port p is mapped. Such common reference signal is used to perform channel measurement and data demodulation on each antenna port. The common reference signal is transmitted in both the control region and the data region.

Resource elements marked with D in FIGS. 9a and 9b denote resource elements to which a UE-specific reference signal, i.e., a dedicated reference signal (DRS) is mapped. The UE-specific reference signal may be used single antenna port transmission of a PDSCH. The UE receives an indication as to whether a UE-specific reference signal is transmitted, and when a PDSCH is transmitted, whether the UE-specific reference signal is valid, through a higher layer signal. The UE-specific reference signal may be transmitted only when data demodulation is needed. The UE-specific reference signal may be transmitted only in the data region.

Figure 10:
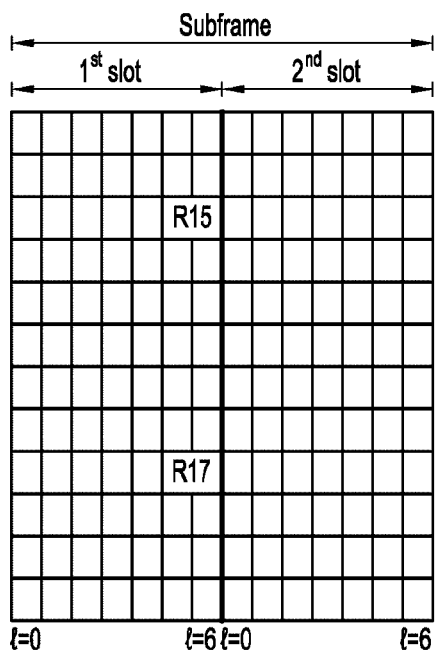
FIG. 10 illustrates an example of a resource block (RB) to which a CSI-RS is mapped among reference signals.
Figure 10:
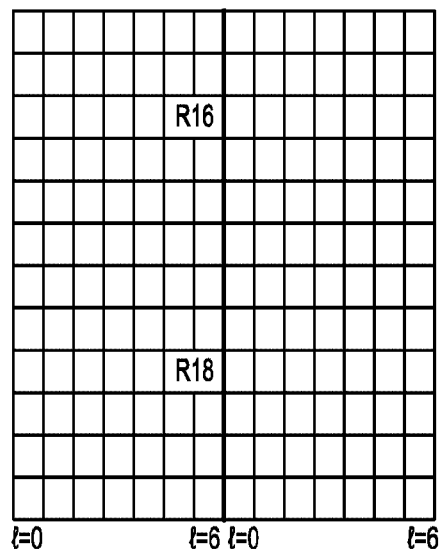
Figure 10:
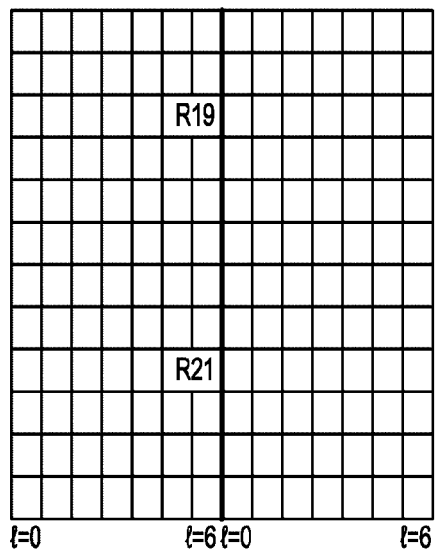
Figure 10:
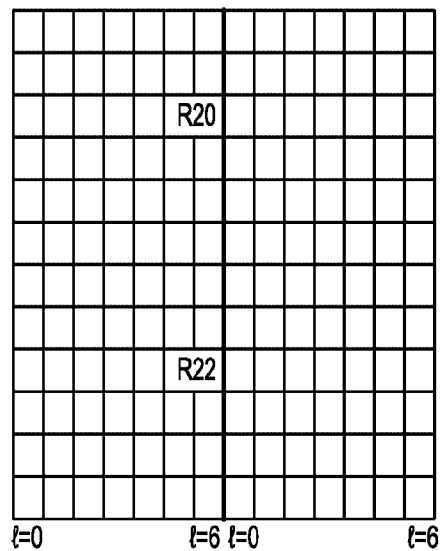

FIG. 10 illustrates an example of an RB to which a CSI-RS is mapped among reference signals.

A CSI-RS is used for channel measurement for generation of channel information and channel estimation on a PDSCH of an LTE-A UE. CSI-RSs are relatively sparsely arranged in the frequency region or time region, and may be punctured in the data region of a normal sub-frame or MBSFN sub-frame. When necessary through CSI estimation, CQI, PMI, and RI may be reported from the UE.

CSI-RSs are transmitted through one, two, four, or eight antenna ports. The antenna ports used here are p=15, p=15, 16, p=15, . . . , 18 and p=15, . . . , 22, respectively. That is, CSI-RSs may be transmitted through one, two, four, and eight antenna ports. See 3GPP (3rd Generation Partnership Project) TS 36.211 V10.1.0 (2011 March) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Table 1 shows an example of CSI-RS-Config IE.

TABLE 4

```
CSI-RS-Config-r10 ::=   SEQUENCE {
  csi-RS-r10              CHOICE {
    release                 NULL,
    setup                   SEQUENCE {
      antennaPortsCount-r10       ENUMERATED {an1, an2, an4, an8},
      resourceConfig-r10          INTEGER (0..31),
      subframeConfig-r10          INTEGER (0..154),
      p-C-r10                     INTEGER (-8..15)
    }
  }                                               OPTIONAL,     -- Need ON
  zeroTxPowerCSI-RS-r10   CHOICE {
    release                 NULL,
    setup                   SEQUENCE {
      zeroTxPowerResourceConfigList-r10   BIT STRING (SIZE (16)),
      zeroTxPowerSubframeConfig-r10                INTEGER (0..154)
    }
  }                                               OPTIONAL      -- Need ON
}
-- ASN1STOP
```

Referring to Table 1, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1 's in the bitmap of 16 bits constituting the 'zeroTxPowerResourceConfigList' field may be set as zero-power CSI-RSs.

A sequence $r_{l,n_s}(m)$ for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, \ldots, N_{RB}^{max,DL} - 1$$

where, $c_{init} =$ $$2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1, $n_s$ is a slot number in the radio frame, and 1 is an OFDM symbol number in the slot. c(i) is a pseudo random sequence and is started at each OFDM symbol with $c_{init}$ indicated in Equation 1. $N^{IDcell}$ means a physical cell ID.

In sub-frames configured to transmit CSI-RSs, the reference signal sequence $r_{l,n_s}(m)$ is mapped to a complex value modulation symbol $a_{k,l}^{(p)}$ used as a reference symbol for antenna port p.

The relationship between $r_{l,n_s}(m)$ and $a_{k,l}^{(p)}$ is given as in the following equation.

[Equation 2]

$$a_{k,l}^{(p)} = w_{l''} \cdot r(m)$$

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases}$$

$$l = l' + \begin{cases} l'' & CSI \text{ reference signal configurations 0-19, normal cyclic prefix} \\ 2l'' & CSI \text{ reference signal configurations 20-31, normal cyclic prefix} \\ l'' & CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the Equation, (k', l') and $n_s$ are given in Tables 2 and 3 described below. A CSI-RS may be transmitted in a downlink slot where ($n_s$ mod 2) meets the conditions in Tables 2 and 3 to be described below (where, 'mod' means modular computation. That is, ($n_s$ mod 2) means the remainder obtained by dividing $n_s$ by 2).

Table 5 represents a CSI-RS configuration in normal CP, and Table 3 represents a CSI-RS configuration in extended CP.

TABLE 5

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 6

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |

TABLE 6-continued

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD | 16 | (11, 1) | 1 | (11, 1) | 1 | (11, 1) | 1 |
| frame | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The UE may transmit CSI-RSs only in the downlink slot meeting the condition of ns mod 2 in Tables 5 and 6. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

Below table shows an example of a configuration of a sub-frame where a CSI-RS is transmitted.

TABLE 7

| CSI-RS-SubframeConfig $I_{CSI-RS}$ | CSI-RS period $T_{CSI-RS}$ (sub-frame) | CSI-RS sub-frame offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Referring to above table, depending on the CSI-RS sub-frame configuration (ICSI-RS), the period (TCSI-RS) of the sub-frame where CSI-RSs are transmitted and an offset (ΔCSI-RS) may be determined. The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Meanwhile, FIG. 10 illustrates resource elements used for CSI-RSs when the CSI-RS configuration index is 0 in normal CP. Rp denotes a resource element used for CSI-RS transmission on antenna port p. Referring to FIG. 10, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RSs for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

<Channel State Information-Interference Measurement (CSI-IM)>

As described above, since the quality of a channel between a UE and a cell depends on interference, it may be important that the cell allows the UE to perform interference measurement (IM) and to transmit an interference measurement report (IMR) in order to identify accurate CSI.

Figure 11:
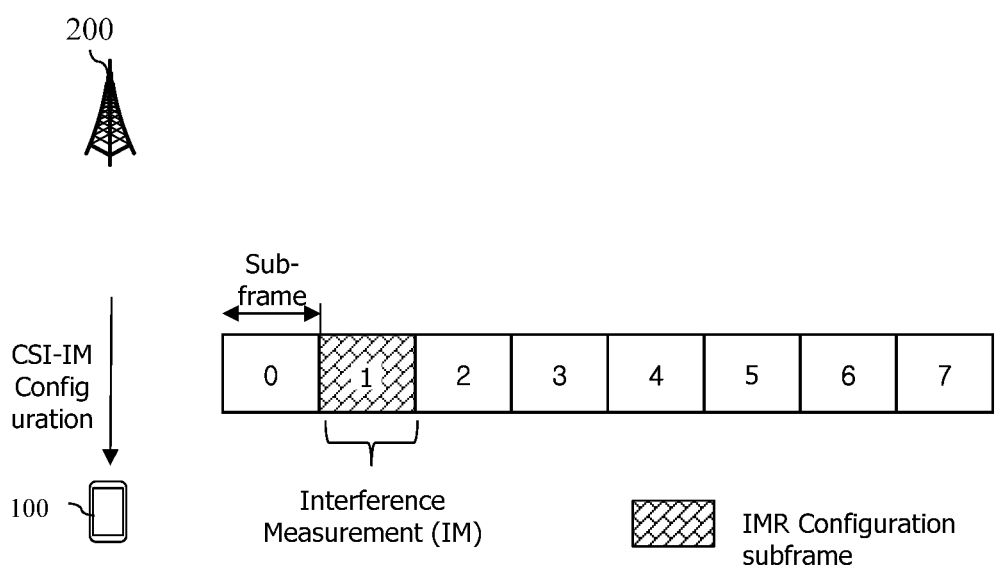
FIG. 11 illustrates an interference measurement report (IMR) configuration subframe for interference measurement (IM).

FIG. 11 illustrates an IMR configuration subframe for IM.

As illustrated in FIG. 11, a BS 200 transmits an IM configuration, for example, a CSI-IM configuration, to a UE 100. The CSI-IM configuration may be transmitted through a higher-layer signal, for example, an RRC signal.

The RRC signal may be a CSI-IM-Config IE and include at least one field illustrated in Table 8.

TABLE 8

| CSI-IM-Config field | Description |
|---|---|
| CSI-IM-ConfigId | Represents ID of CSI-IM configuration. |
| resourceConfig | Represents CSI-RS configuration. |
| subframeConfig | Subframe configuration for performing IM |

Referring to the subframeConfig parameter in Table 8, IM is configured by subframe. Here, a subframe for performing IM is configured to be the same as the CSI-RS-Subframe-Config (ICSI-RS) in Table 4. That is, the subframe for performing IM is the same as a subframe for transmitting the CSI-RS.

FIG. 11 illustrates that a subframe for performing IM is subframe 1.

As such, the UE 100 may measure interference by a neighbor cell on downlink subframe 1 configured for IM and calculate channel quality using the measured interference.

<Coordinated Multipoint (CoMP) Transmission/Reception>

Hereinafter, CoMP transmission/reception will be described.

A future wireless communication system may implement CoMP transmission/reception using carrier aggregation.

CoMP transmission/reception refers to an inter-node coordinated communication scheme. A multi-cell multi-distributed node system may adopt CoMP transmission/reception to reduce inter-cell interference, and a single-cell multi-distributed node system may adopt CoMP transmission/reception to reduce intra-cell inter-point interference. Using CoMP transmission/reception allows a UE to receive joint support of data from multiple nodes. Using CoMP transmission/reception allows each BS to simultaneously support one or more UEs using the same radio frequency resource in order to improve system performance. Further, using CoMP transmission/reception allows a BS to perform space division multiple access (SDMA) based on information on the state of a channel between the BS and a UE.

A main purpose of CoMP transmission/reception is to improve the communication performance of-boundary or node-boundary UEs.

Figure 12:
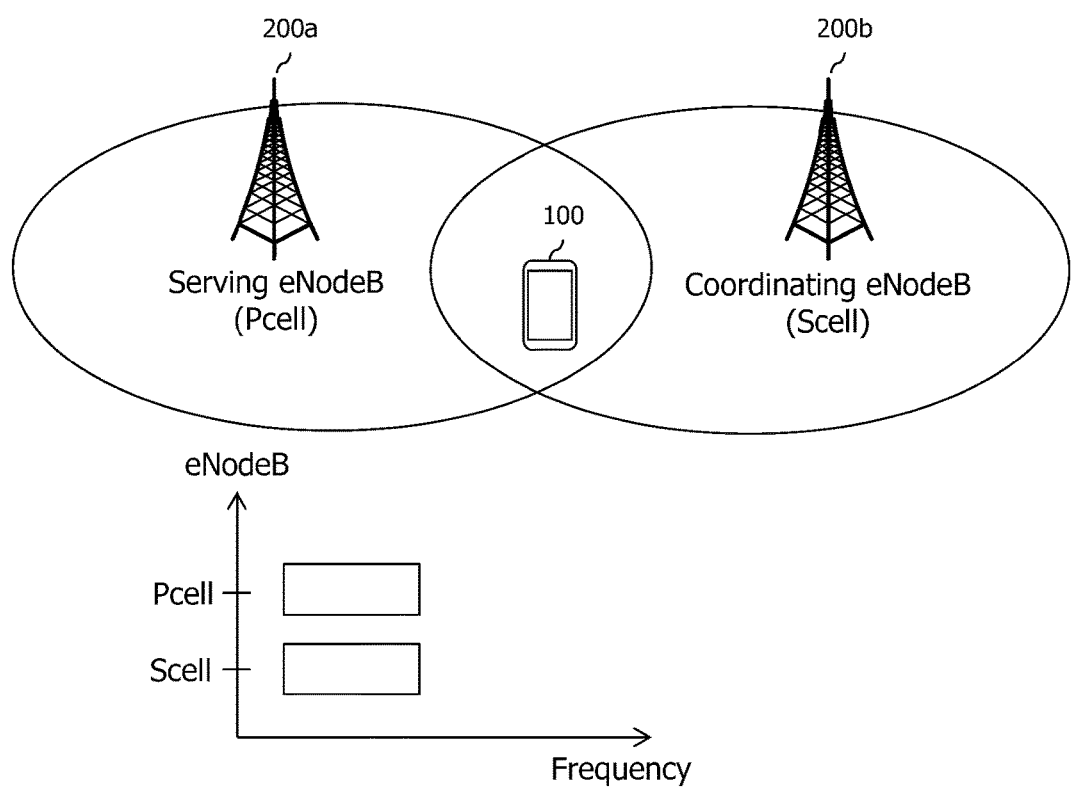
FIG. 12 illustrates a coordinated multipoint (CoMP) system using carrier aggregation.

FIG. 12 illustrates a CoMP system using carrier aggregation.

Referring to FIG. 12, the CoMP system may include a serving eNB and a coordinating eNB which are geographically distant. A frequency used by the serving eNB may be referred to as a primary cell (Pcell) carrier, and a frequency used by the coordinating eNB may be referred to as a secondary cell (Scell) carrier. Here, the Pcell carrier and the Scell carrier may use the same frequency band.

The serving eNB and the coordinating eNB may perform various known DL/UL CoMP operations, such as joint transmission, coordinated scheduling (CS)/coordinated beamforming (CB) and dynamic cell selection, for a particular UE.

FIG. 12 illustrates that two BSs (or two sectors of one BS) are aggregated as a CoMP Pcell and a CoMP Scell for one UE, without being limited thereto. Instead, three or more cells may be aggregated for one UE, some of which may perform CoMP operations in the same frequency band and the remaining of which may perform simple CA operations in a different frequency band. Here, a Pcell does not necessarily participate in CoMP operations. Further, although CoMP operations are generally performed in the same frequency band, in dynamic cell selection, CoMP operations may be performed in different frequency bands of different BSs.

A Pcell is a distinguishing cell among serving cells of carrier aggregation, to which a UE may first establish RRC connection. The Pcell is a cell in which a UE receives a physical channel to obtain primary system information, such as a PBCH through a downlink and a PDCCH in a common search space, and transmits a PUCCH carrying an ACK/NACK, CSI and the like through an uplink with the Pcell. A Scell refers to any cell other than the primary cell among the cells of carrier aggregation for a UE, which has been described in detail in the description of carrier aggregation.

A CoMPPcell refers to a distinguishing cell among cells belonging to a CoMP set. The CoMPPcell may be the same as a Pcell. Alternatively, the CoMPPcell may be a cell set through RRC signaling, other than a Pcell.

The CoMPPcell may be a cell transmitting a PDCCH for scheduling PDSCH/PUSCH transmissions for CoMP cells when cross-carrier scheduling is applied in the CoMP set.

A CoMPScell refers to a cell other than the CoMPPCell among the CoMP cells.

Figure 13A:
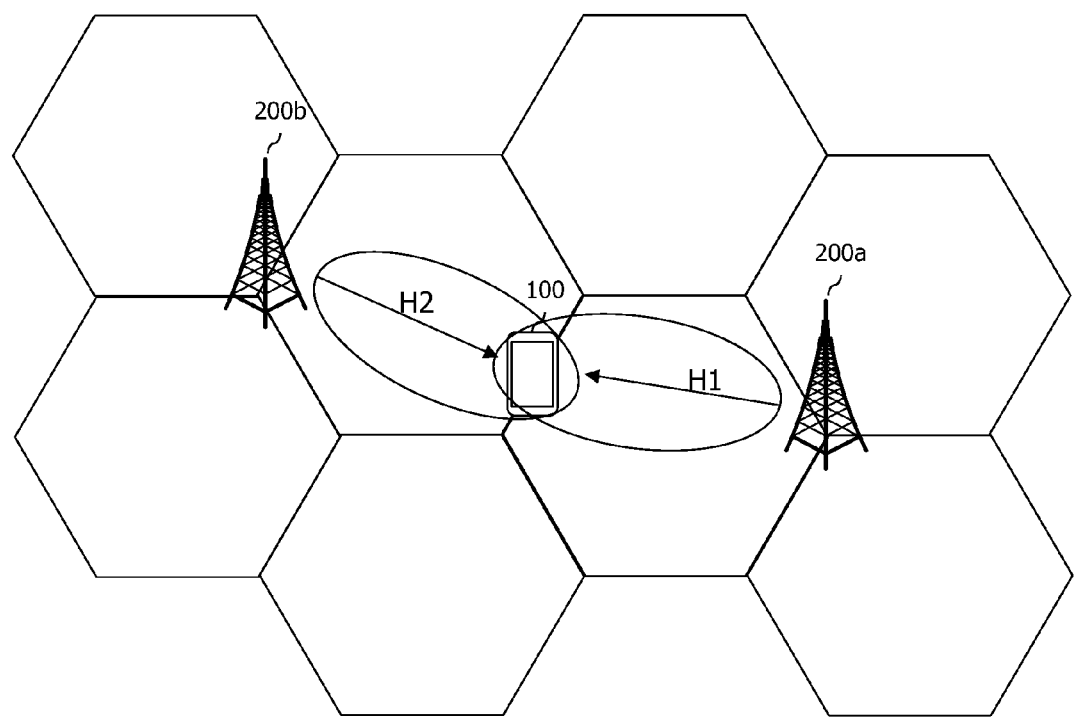
FIGS. 13a and 13b illustrate a data transmission method using CoMP transmission.
Figure 13B:
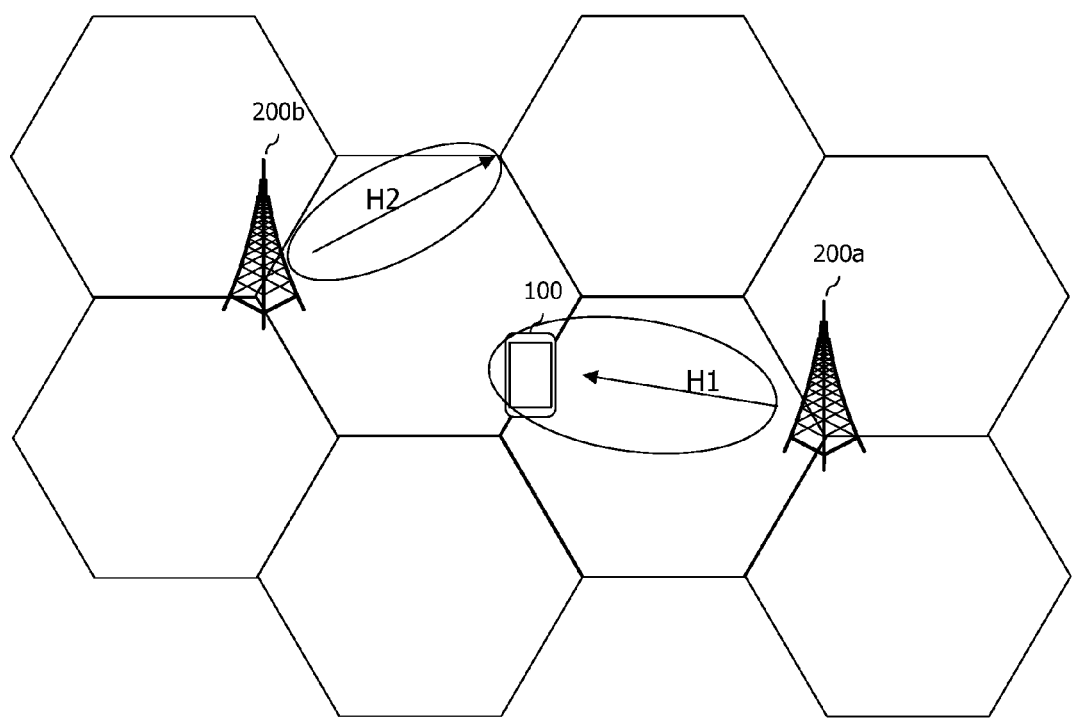

FIGS. 13a and 13b illustrate a data transmission method using CoMP transmission.

In LTE, CoMP methods may broadly be divided into joint processing (JP) and coordinated scheduling (CS)/coordinated beamforming (CB) according to data transmission methods.

FIG. 13a illustrates JP. Referring to FIG. 13a, JP refers to a method in which one or more nodes 200a and 200b jointly transmit data for a UE 100.

JP may broadly be divided into two schemes according to transmission methods, for example, joint transmission and dynamic point selection (DPS). Joint transmission may further be divided into coherent joint transmission and non-coherent joint transmission. In DPS, one cell (or node 200a) among a plurality of cells may transmit data through a PDSCH and another cell (or node 200b) may transmit data to the UE 100 using an interference removal method with muting. When DPS is used, the transmitting node and the muting node may be changed when one subframe transmits another subframe or based on an RB pair in one frame.

FIG. 13b illustrates CS/CB. Referring to FIG. 13b, in CS/CB, only one node (serving point 200a) is allowed to perform transmission to the UE 100 and another node 200b may cooperate with the serving point to reduce interference.

Figure 14:
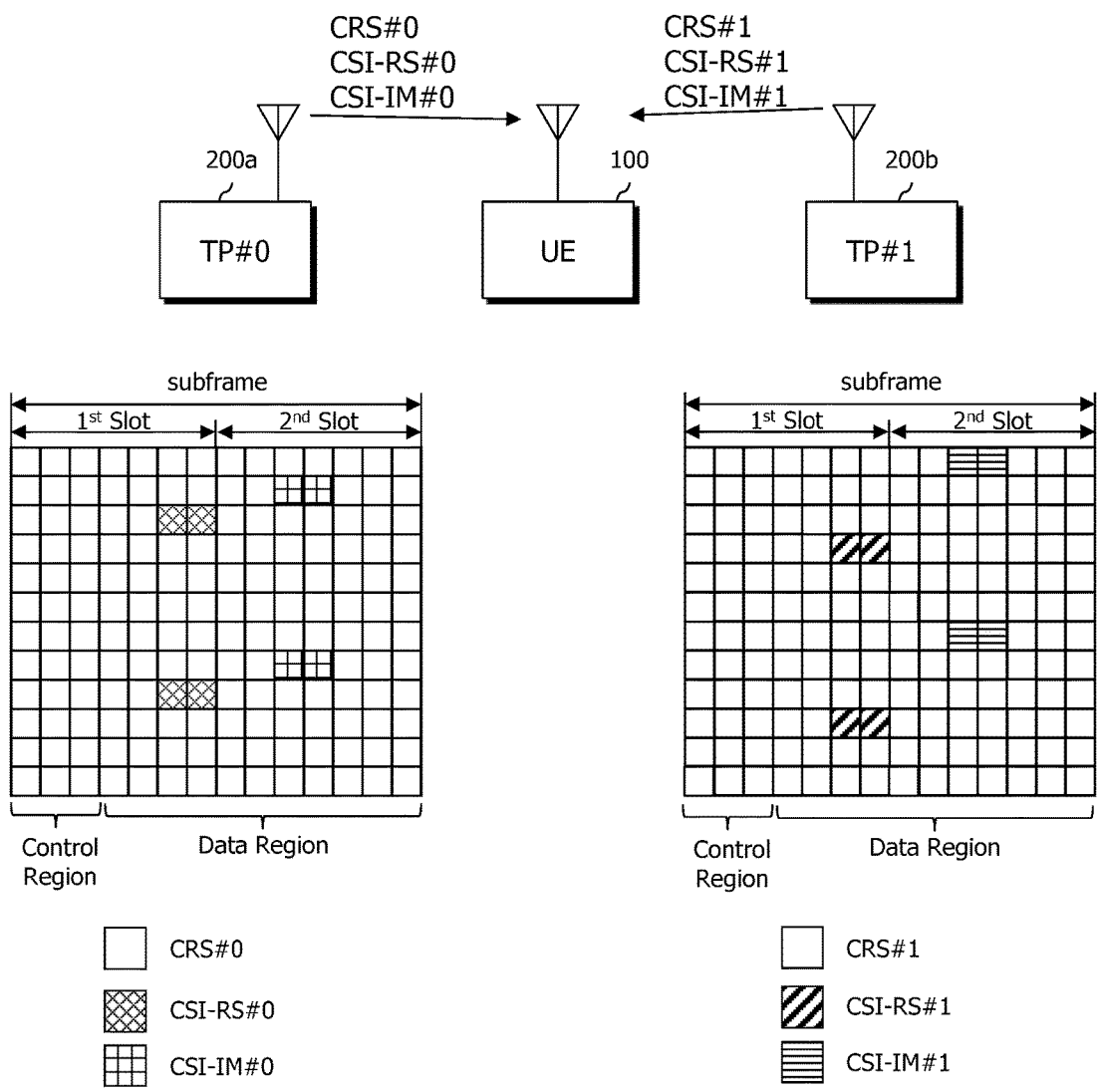
FIG. 14 illustrates a problem of CoMP transmission.

FIG. 14 illustrates a problem of CoMP transmission.

FIG. 14 shows two transmission points (TPs) 200a and 200b and a UE 100. The two TPs 200a and 200b may be eNodeBs or remote radio heads (RRHs). That is, the two TPs may be a combination of macro base stations, a combination of a macro base station and a small cellular base station, or a combination of small cellular base stations. Such CoMP transmission is defined as transmission mode 10 in Table 2.

However, in transmission mode 10, a CQI mismatch may occur depending on receiver capability of a UE. Specifically, in transmission mode 10, a UE may measure a channel using a non-zero power (NZP) CSI-RS and measure interference using CSI-IM to feed back CSI. However, the UE may feed back CSI including an inaccurate CQI depending on receiver capability of the UE to limit improvement in reception rate of the UE. Here, the receiver capability of the UE indicates whether a receiver of the UE supports CRS interference cancellation (CRS-IC) or network assistance interference cancellation and suppression (NAICS). CRS-IC means removing a CRS signal received from a cell causing interference, and NAICS refers to removing a CRS/DMRS/PDCCH/PDSCH signal received from a cell causing interference with network support. Although a UE having a receiver supporting CRS-IC or NAICS is capable of removing interference when receiving data through a PDSCH, when the UE measures CSI-IM and feeds back a CQI without considering CRS-IC or NAICS, the CQI is inaccurate.

For example, in FIG. 14, a subframe for TP#0 200a to transmit CRS#0, CSI-RS#0 and CSI-IM#0 is illustrated at the bottom left, and a subframe for TP#1 200b to transmit CRS#1, CSI-RS#1 and CSI-IM#1 is illustrated at the bottom right. Although the UE 100 is actually capable of removing interference caused by TP#0 200*a* using CRS-IC or NAICS when receiving data from TP#1 through a PDSCH, when the UE 100 measures NZP CSI-RS#1 and CSI-IM#1 received from TP#1 200*b* and feeds back a CQI to TP#1 200*b* without considering CRS-IC or NAICS as illustrated in the subframe at the bottom right of FIG. 14, the fed back CQI may be an underestimated CQI. Alternatively, in a case where CRSs from TP#0 200*a* and TP#1 200*b* do not collide on the same RE and the UE 100 does not support CRS-IC, although the UE 100 measures CSI-IM#1 of TP#1 200*b* and feeds back a CQI without considering interference caused by TP#0 200*a*, a CRS from TP#1 200*a* actually causes interference with data on a PDSCH received from TP#1 200*b*, so that a receiving block error rate (BLER) is increased to reduce a reception rate.

As described above, in transmission mode 10, a CQI fed back by a UE may be inconsistent with an actual CQI according to interference measured by CSI-IM depending on receiver capability of the UE. That is, a measured CQI may not correspond to an actual CQI depending on whether a neighbor cell transmits data on the position of a measured CSI-IM resource.

EMBODIMENT OF THE PRESENT INVENTION

Thus, the present invention is to disclose a CQI-IM configuring scheme and a CQI feedback scheme for solving a CQI mismatch based on receiver capability of a UE.

The present invention illustrates a CQI feedback scheme based on receiver capability of a UE assuming that the UE basically supports a CoMP network in transmission mode 10.

A CQI agreement and a CQI mismatch may occur in the following cases.

First, when the UE supports CRS-IC/NAICS and TP#0 and TP#1 support dynamic point scheduling (DPS), a CQI feedback is an underestimate as compared with an actual CQI.

Second, when the UE supports CRS-IC/NAICS and TP#0 and TP#1 support dynamic point blocking (DPB), a CQI feedback corresponds to an actual CQI.

Third, when the UE does not support CRS-IC/NAICS and TP#0 and TP#1 support DPS, a CQI feedback corresponds to an actual CQI.

Fourth, when the UE does not support CRS-IC/NAICS and TP#0 and TP#1 support DPB, a CQI feedback is an overestimate as compared with an actual CQI.

In the first case, since the UE supports CRS-IC/NAICS, the UE feeds back a CQI subjected to CRS-IC/NAICS to increase a reception rate. However, to perform CRS-IC/NAICS, information on a neighbor TP needs to be transmitted to the UE. If the UE feeds back a CQI, considering that CRS-IC/NAICS is supportable, even though such information is unavailable to the UE, performance may be reduced. In the second case, if support information for removing interference is unavailable to the UE, as in the fourth case, an RE of a PDSCH including downlink data collides with an RE of a CRS of a cell causing interference, so that a BLER may be increased to reduce a reception rate.

In all of the above cases, to resolve a CQI mismatch, one embodiment of the present invention suggests that two TPs (that is, TP#0 and TP#1) use at least three CSI-IM configurations and a UE feeds back two CQIs, which will be described below with reference to the drawings.

Figure 15:
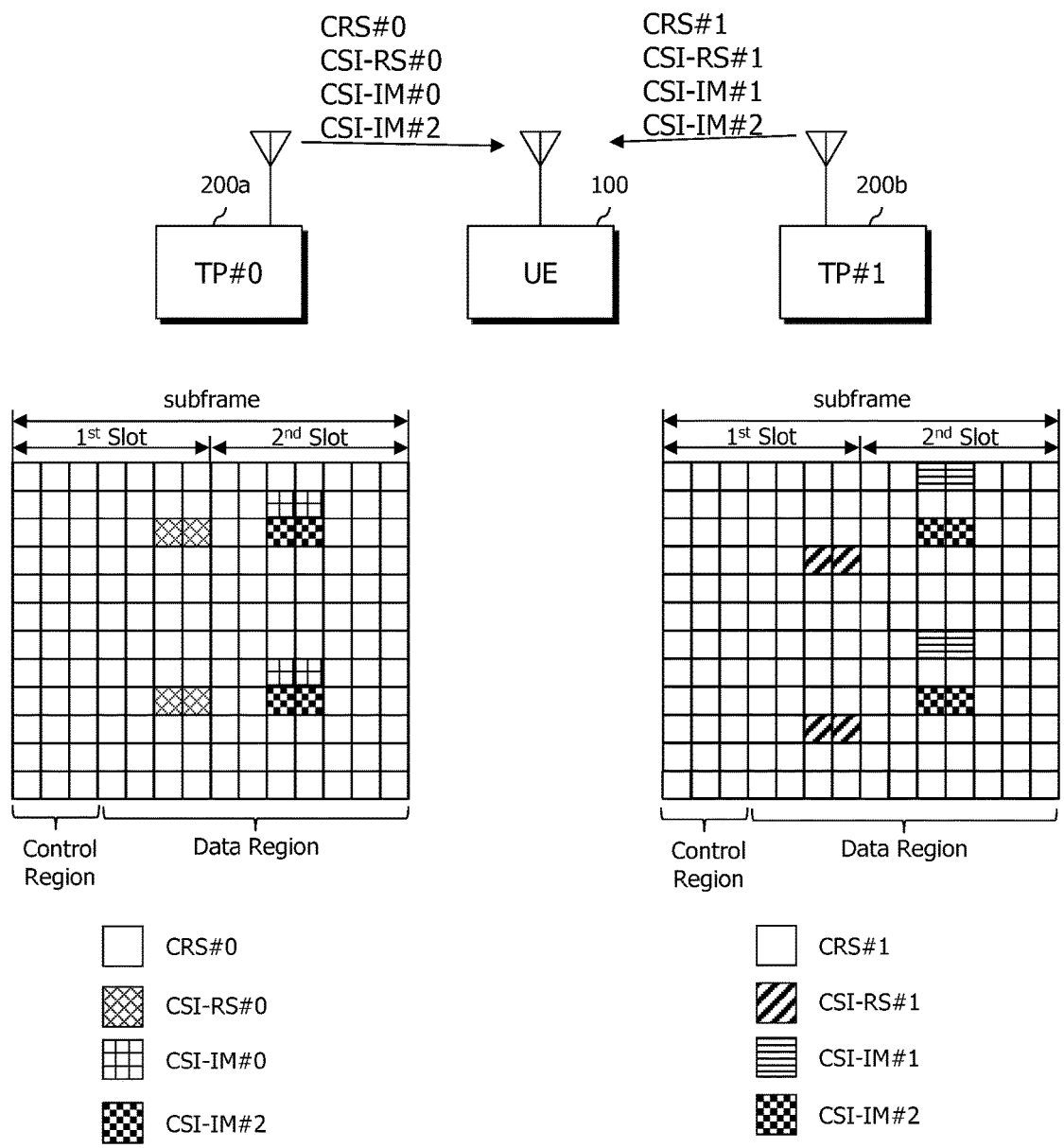
FIG. 15 illustrates a scheme according to one embodiment of the present invention.

FIG. 15 illustrates a scheme according to one embodiment of the present invention.

Referring to FIG. 15, one embodiment of the present invention suggests that two TPs (that is, TP#0 and TP#1) configure at least three CSI-IMs (that is, CSI-IM#0, CSI-IM#1 and CSI-IM#2) and a UE feeds back two CQIs.

As illustrated in FIG. 15, the three CSI-IMs includes CSI-IM#0 for measuring interference caused by TP#1 to TP#0, CSI-IM#1 for measuring interference caused by TP#0 to TP#1, and CSI-IM#2 configured in the corresponding RE positions by the two TPs (TP#0 and TP#1) to exclude dominant interference. Generally, improvement in interference removal performance through CRS-IC/NAICS is determined on dominant interference. Accordingly, a CRS-IC/NAICS-enabled UE may measure interference based on CSI-IM#2 to measure and feed back a CQI, while a UE having no CRS-IC/NAICS receiver may measure and feed back a CQI using CSI-IM#0 and CSI-IM#1. As described above, however, when the UE having the CRS-IC/NAICS receiver receives no network support information, the UE may feed back two CQIs based on CSI-IM#0/CSI-IM#1 and CSI-IM#2 since a CQI mismatch may occur. Accordingly, the network may select one of the two CQIs depending on whether interference removal support information can be transmitted and schedule radio resources.

Figure 16:
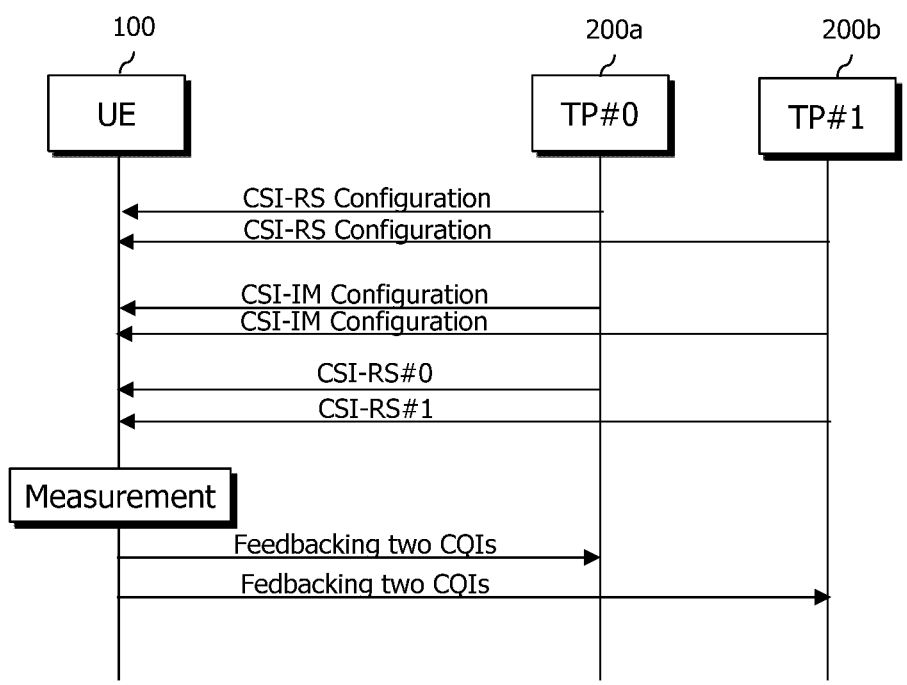
FIG. 16 is a flowchart illustrating a scheme according to one embodiment of the present invention.

FIG. 16 is a flowchart illustrating a scheme according to one embodiment of the present invention.

Referring to FIG. 16, TP#0 200*a* and TP#1 200*b* each transmit a CSI-RS configuration and a CSI-IM configuration to a UE 100. In FIG. 16, it is assumed that TP#0 200*a* and TP#1 200*b* may be a combination of macro base stations, a combination of a macro base station and a small cellular base station, or a combination of small cellular base stations. However, when TP#0 200*a* and TP#1 200*b* are an RRH of one base station, a CSI-RS configuration and a CSI-IM configuration may be transmitted from either TP only.

According to one embodiment of the present invention, the CSI-IM configuration may include at least three CSI-IMs (that is, CSI-IM#0, CSI-IM#1 and CSI-IM#2) by two TPs (that is, TP#0 and TP#1). That is, a CSI-IM configuration by TP#0 200*a* may include CSI-IM#0 and CSI-IM#2, and a CSI-IM configuration by TP#1 200*b* may include CSI-IM#1 and CSI-IM#2. CSI-IM#0 is for measuring interference caused by TP#1 to TP#0, CSI-IM#1 is for measuring interference caused by TP#0 to TP#1, and CSI-IM#2 is positioned on the corresponding REs between two TPs (TP#0 and TP#1) to exclude dominant interference.

The UE 100 measures interference caused by TP#1 200*b* using CSI-IM#0 configured for TP#0 200*a* and can use the measured interference to calculate channel quality measured using CSI-RS#0. Further, the UE 100 measures dominant interference by other interference sources than the two TPs using CSI-IM#2 configured in the corresponding RE positions by TP#0 200*a* and TP#1 200*b*. Likewise, the UE 100 measures interference caused by TP#0 200*a* using CSI-IM#1 configured by TP#1 200*b* and can use the measured interference to calculate channel quality measured using CSI-RS#1. Further, the UE 100 measures dominant interference by other interference sources than the two TPs using CSI-IM#2 configured in the corresponding RE positions by TP#0 200*a* and TP#1 200*b*.

Subsequently, the UE 100 feeds back two CQIs. Here, one of the two CQIs is transmitted as a delta CQI to reduce the number of feedback bits. Furthermore, CQIs may be divided into a wideband CQI feedback mode and a subband CQI feedback mode, and the UE may feed back two CQIs in each mode.

A CQI based on CSI-IM#2 is an interference-free CQI. Thus, there are two CQIs depending on whether CRS-IC/NAICS is supported.

a) A CQI measured based on CSI-IM#2 and fed back: A CQI is simply measured, assuming that interference is thoroughly removed through CRS-IC/NAICS.

b) A CQI fed back in a CQI range based on CSI-IM#0/CSI-IM#1 and CSI-IM#2 according to an interference signal level: As interference removal performance changes on an interference level, information on an interference level and an optimization point are needed in determining a CQI and a CQI can reflect an actual environment in which interference cannot be thoroughly removed through CRS-IC/NAICS.

In case a among the two cases, a CQI is fed back only based on interference measured by CSI-IM#2. In case b, defining a CQI based on CSI-IM#0/CSI-IM#1 as CQImim and a CQI based on CSI-IM#2 as CQImax, when an interference-to-signal ratio (ISR) is measured to be 0 dB or lower (that is, a signal from an interference source causing interference is a signal from a TP experiencing interference or smaller), CQImin may be fed back. When the ISR is X dB or greater, CQImax may be fed back. In a 0<ISR<X range, the range is divided by N (=CQImax−CQImin−1) into N sections, and a CQI in a corresponding section (kth section) to which the ISR belongs, that is, CQImin+k, may be fed back.

For example, as illustrated in Table 9, when N=3, a range between 0 and X is divided by n1 and n2 and an index k to which the ISR belongs may be used.

TABLE 9

| ISR | k |
|---|---|
| $0 < ISR < n_1$ | 1 |
| $n_1 \le ISR < n_2$ | 2 |
| $n_2 \le ISR < X$ | 3 |

The aforementioned embodiments of the present invention can be implemented through various means. For example, the embodiments of the present invention can be implemented in hardware, firmware, software, or a combination thereof, which will be described in detail with reference to the drawing.

Figure 17:
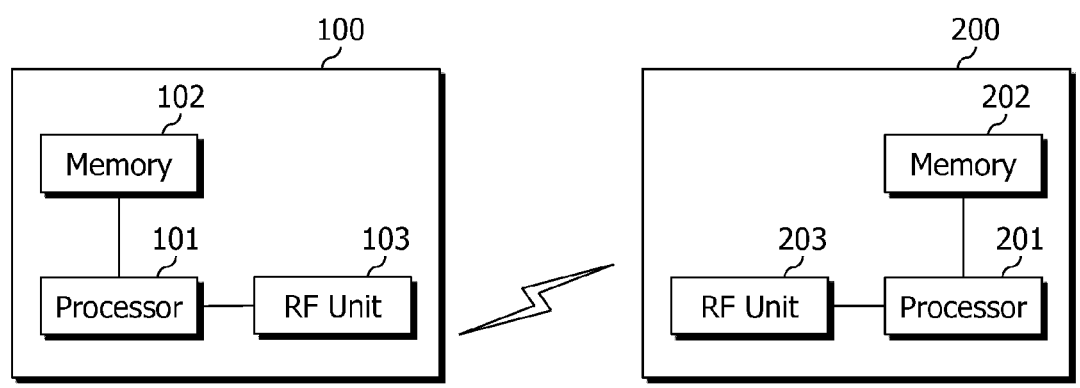
FIG. 17 is a block diagram illustrating a wireless communication system according to an embodiment of the present invention.

FIG. 17 is a block diagram illustrating a wireless communication system according to an embodiment of the present invention.

A BS 200 includes a processor 201, a memory 202, and a radio frequency (RF) unit 203. The memory 202 is connected with the processor 201 and stores various pieces of information for driving the processor 201. The RF unit 203 is connected with the processor 201 and transmits and/or receives radio signals. The processor 201 implements proposed functions, procedures, and/or methods. In the aforementioned embodiments, operations of the BS may be implemented by the processor 201.

A UE 100 includes a processor 101, a memory 102, and an RF unit 103. The memory 102 is connected with the processor 101 and stores various pieces of information for driving the processor 101. The RF unit 103 is connected with the processor 101 and transmits and/or receives radio signals. The processor 101 implements proposed functions, procedure, and/or methods.

The processors may include an application-specific integrated circuit (ASIC), a separate chipset, a logic circuit, and/or a data processing unit. The memories may include a read-only memory (ROM), a random access memory (RAM), a flash memory, a memory card, a storage medium, and/or other equivalent storage devices. The RF units may include a base-band circuit for processing a radio signal. When the embodiments are implemented in software, the aforementioned methods can be implemented with a module (i.e., process, function, etc.) for performing the aforementioned functions. The module may be stored in the memories and be performed by the processors. The memories may be located inside or outside the processors and be connected to the processors via various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A channel quality reporting method of a user equipment (UE), the method comprising:
   receiving a channel state information-interference measurement (CSI-IM) configuration for first and second transmission points (TPs),
   wherein the CSI-IM configuration includes configurations for at least three CSI-IMs, and
   wherein the configurations for the at least three CSI-IMs includes a configuration for first CSI-IM for measuring interference caused by the second TP toward the first TP, a configuration for second CSI-IM for measuring interference caused by the first TP toward the second TP, and a configuration for third CSI-IM for measuring interference from another interference source; and
   transmitting a channel quality indicator (CQI) measured using the first CSI-IM and a CQI measured using the third CSI-IM.

2. The method of claim 1, further comprising:
   transmitting a CQI measured using the second CSI-IM and the CQI measured using the third CSI-IM.

3. The method of claim 1, wherein the first CSI-IM and the second CSI-IM are configured in different resource elements (REs).

4. The method of claim 1, wherein the third CSI-IM is configured on the same REs of the first TP and the second TP.

5. The method of claim 1, wherein the transmitting comprises transmitting one of the CQI measured using the first CSI-IM or second CSI-IM and the CQI measured using the third CSI-IM, expressed as an offset or delta value compared with the other thereof.

6. The method of claim 1, further comprising:
   receiving a configuration for a channel state information-reference signal (CSI-RS) of the first TP and a configuration for a CSI-RS of the second TP.

7. The method of claim 1, wherein the receiving of the CQI comprises transmitting one of the CQI measured using the first CSI-IM or second CSI-IM and the CQI measured using the third CSI-IM, expressed as an offset or delta value compared with the other thereof.

8. A method of receiving a channel quality report from a user equipment (UE), the method comprising:
   transmitting, to the UE, a channel state information-interference measurement (CSI-IM) configuration for first and second transmission points (TPs), wherein the CSI-IM configuration includes configurations for at least three CSI-IMs, and wherein the configurations for the at least three CSI-IMs includes a configuration for first CSI-IM for measuring interference caused by the second TP toward the first TP, a configuration for second CSI-IM for measuring interference caused by the first TP toward the second TP, and a configuration for third CSI-IM for measuring interference from another interference source; and receiving, from the UE, a channel quality indicator (CQI) measured using the first CSI-IM and a CQI measured using the third CSI-IM.

9. The method of claim 8, further comprising:
receiving a CQI measured using the second CSI-IM and the CQI measured using the third CSI-IM.

10. The method of claim 8, wherein the first CSI-IM and the second CSI-IM are configured in different resource elements (REs).

11. The method of claim 8, wherein the third CSI-IM is configured on the same REs of the first TP and the second TP.

12. The method of claim 8, further comprising:
scheduling a radio resource by selecting one of the CQI measured using the first CSI-IM and the CQI measured using the third CSI-IM depending on whether interference removal support information is transmitted to the UE.

13. A user equipment (UE) reporting channel quality, the UE comprising:
a receiver to receive a channel state information-interference measurement (CSI-IM) configuration for first and second transmission points (TPs), wherein the CSI-IM configuration includes configurations for at least three CSI-IMs, and wherein the configurations for the at least three CSI-IMs includes a configuration for first CSI-IM for measuring interference caused by the second TP toward the first TP, a configuration for second CSI-IM for measuring interference caused by the first TP toward the second TP, and a configuration for third CSI-IM for measuring interference from another interference source; and a transmitter to transmit a channel quality indicator (CQI) measured using the first CSI-IM and a CQI measured using the third CSI-IM.

14. A base station receiving a channel quality report from a user equipment (UE), the base station comprising:
a transmitter to transmit, to the UE, a channel state information-interference measurement (CSI-IM) configuration for first and second transmission points (TPs), wherein the CSI-IM configuration includes configurations for at least three CSI-IMs, and wherein the configurations for the at least three CSI-IMs includes a configuration for first CSI-IM for measuring interference caused by the second TP toward the first TP, a configuration for second CSI-IM for measuring interference caused by the first TP toward the second TP, and a configuration for third CSI-IM for measuring interference from another interference source; and a receiver to receive, from the UE, a channel quality indicator (CQI) measured using the first CSI-IM and a CQI measured using the third CSI-IM.

* * * * *